(12) United States Patent
Craine et al.

(10) Patent No.: US 9,900,724 B2
(45) Date of Patent: *Feb. 20, 2018

(54) METHOD FOR MANAGING DEVICE CONFIGURATIONS USING CONFIGURATION TEMPLATES

(71) Applicants: AT&T INTELLECTUAL PROPERTY I, L.P., Atlanta, GA (US); AT&T MOBILITY II LLC, Atlanta, GA (US)

(72) Inventors: Ari Craine, Marietta, GA (US); Matthew Arcaro, Chicago, IL (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/591,933

(22) Filed: May 10, 2017

(65) Prior Publication Data

US 2017/0245093 A1 Aug. 24, 2017

Related U.S. Application Data

(60) Continuation of application No. 15/399,092, filed on Jan. 5, 2017, now Pat. No. 9,686,631, which is a
(Continued)

(51) Int. Cl.
*G06F 15/177* (2006.01)
*H04W 4/00* (2018.01)
(Continued)

(52) U.S. Cl.
CPC ......... *H04W 4/001* (2013.01); *H04L 41/0806* (2013.01); *H04W 8/22* (2013.01)

(58) Field of Classification Search
CPC ... H04L 41/0806; H04L 67/125; H04W 4/001
See application file for complete search history.

(56) References Cited

U.S. PATENT DOCUMENTS 7,603,445 B1 10/2009 Fehrle
7,720,940 B1 5/2010 Wilsey et al.
(Continued)

FOREIGN PATENT DOCUMENTS

| WO | 0169383 A1 | 9/2001 |
| WO | 2005/119437 | 12/2005 |
| WO | 2014070055 A1 | 5/2014 |

OTHER PUBLICATIONS

France, "Bundlr: Create Bundles of Content to Share on the Web", http://www.bloggingtips.com/2012/12/20/bundlr-create-bundles-of-content-to-share-on-the-web/, Dec. 20, 2012.
(Continued)

*Primary Examiner* — Oanh Duong
(74) *Attorney, Agent, or Firm* — Guntin & Gust, PLC; Matthew Tropper

(57) ABSTRACT

Aspects of the subject disclosure may include, for example, identifying a configuration of a second end user device that includes device data and applications, generating a configuration template associated with the second end user device, providing a first end user device with access to the configuration template for enabling the first end user device to be configured, detecting an adjustment to the configuration of the second end user device, and transmitting a notification of a configuration change at the second end user device responsive to the detecting of the adjustment to enable the first end user device to be reconfigured according to the adjustment to the configuration of the second end user device. Other embodiments are disclosed.

20 Claims, 10 Drawing Sheets

Related U.S. Application Data division of application No. 14/084,980, filed on Nov. 20, 2013, now Pat. No. 9,577,877.

(51) Int. Cl.
*H04W 8/22* (2009.01)
*H04L 12/24* (2006.01)

(56) References Cited

U.S. PATENT DOCUMENTS

| | | |
|---|---|---|
| 7,912,916 B2 | 3/2011 | Rakowski et al. |
| 8,082,505 B2 | 12/2011 | Meimer et al. |
| 8,365,162 B2 | 1/2013 | Rauma |
| 8,429,626 B2 | 4/2013 | Lerum et al. |
| 8,522,272 B2 | 8/2013 | Adimatyam et al. |
| 2002/0178239 A1 | 11/2002 | Kinyon et al. |
| 2002/0178380 A1 | 11/2002 | Wolf et al. |
| 2006/0287740 A1 | 12/2006 | Ertel et al. |
| 2007/0100948 A1 | 5/2007 | Adams et al. |
| 2007/0133567 A1 | 6/2007 | West et al. |
| 2007/0283011 A1* | 12/2007 | Rakowski ........... H04L 41/0803 709/225 |
| 2008/0005344 A1 | 1/2008 | Ford et al. |
| 2008/0133677 A1 | 6/2008 | Pattabhiraman et al. |
| 2009/0210631 A1 | 8/2009 | Bosworth et al. |
| 2009/0253416 A1 | 10/2009 | Lee et al. |
| 2010/0031076 A1 | 2/2010 | Wan et al. |
| 2010/0223098 A1 | 9/2010 | Hjelm et al. |
| 2010/0281143 A1 | 11/2010 | Krahn et al. |
| 2012/0218917 A1 | 8/2012 | Komarevtsen et al. |
| 2012/0245988 A1 | 9/2012 | Pace et al. |
| 2012/0254791 A1 | 10/2012 | Jackson et al. |
| 2013/0086373 A1 | 4/2013 | Rothkopf et al. |
| 2013/0097715 A1 | 4/2013 | Fourman |
| 2013/0110992 A1 | 5/2013 | Ravindra et al. |
| 2013/0165180 A1 | 6/2013 | Fukuda Kelley et al. |
| 2013/0166649 A1 | 6/2013 | Atzmon et al. |
| 2013/0185656 A1 | 7/2013 | Heikes et al. |
| 2014/0095677 A1 | 4/2014 | Croy et al. |
| 2014/0149358 A1 | 5/2014 | Aphale et al. |
| 2014/0247750 A1 | 9/2014 | Tapia et al. |
| 2017/0118575 A1 | 4/2017 | Craine |

OTHER PUBLICATIONS

Kent Social Media, "Social Media Management", http://kentsocialmedia.co.uk/social-media-marketing/social-media-management, Oct. 22, 2013.

* cited by examiner

600

METHOD FOR MANAGING DEVICE CONFIGURATIONS USING CONFIGURATION TEMPLATES

CROSS-REFERENCE TO RELATED APPLICATIONS

This application is a continuation of and claims priority to U.S. patent application Ser. No. 15/399,092, filed Jan. 5, 2017, now U.S. Pat. No. 9,686,631, which is a divisional of and claims priority to U.S. patent application Ser. No. 14/084,980, filed Nov. 20, 2013, now U.S. Pat. No. 9,577,877, which are incorporated herein by reference in their entirety.

FIELD OF THE DISCLOSURE

The subject disclosure relates to a method for managing device configurations using configuration templates.

BACKGROUND

When purchasing a communication device, a user selects a device, then adds a plan, adds a service(s), and adds accessories. This process can be time consuming and inefficient, particularly for users that are less knowledgeable about the various options that exist. Fragmentation and custom original equipment manufacturer builds can leave users with inconsistencies across devices. Often times, the selection and provisioning of the communication devices with content, applications and accessories can dis-intermediate the service provider from the user.

BRIEF DESCRIPTION OF THE DRAWINGS

Reference will now be made to the accompanying drawings, which are not necessarily drawn to scale, and wherein.

DETAILED DESCRIPTION

Figure 1:
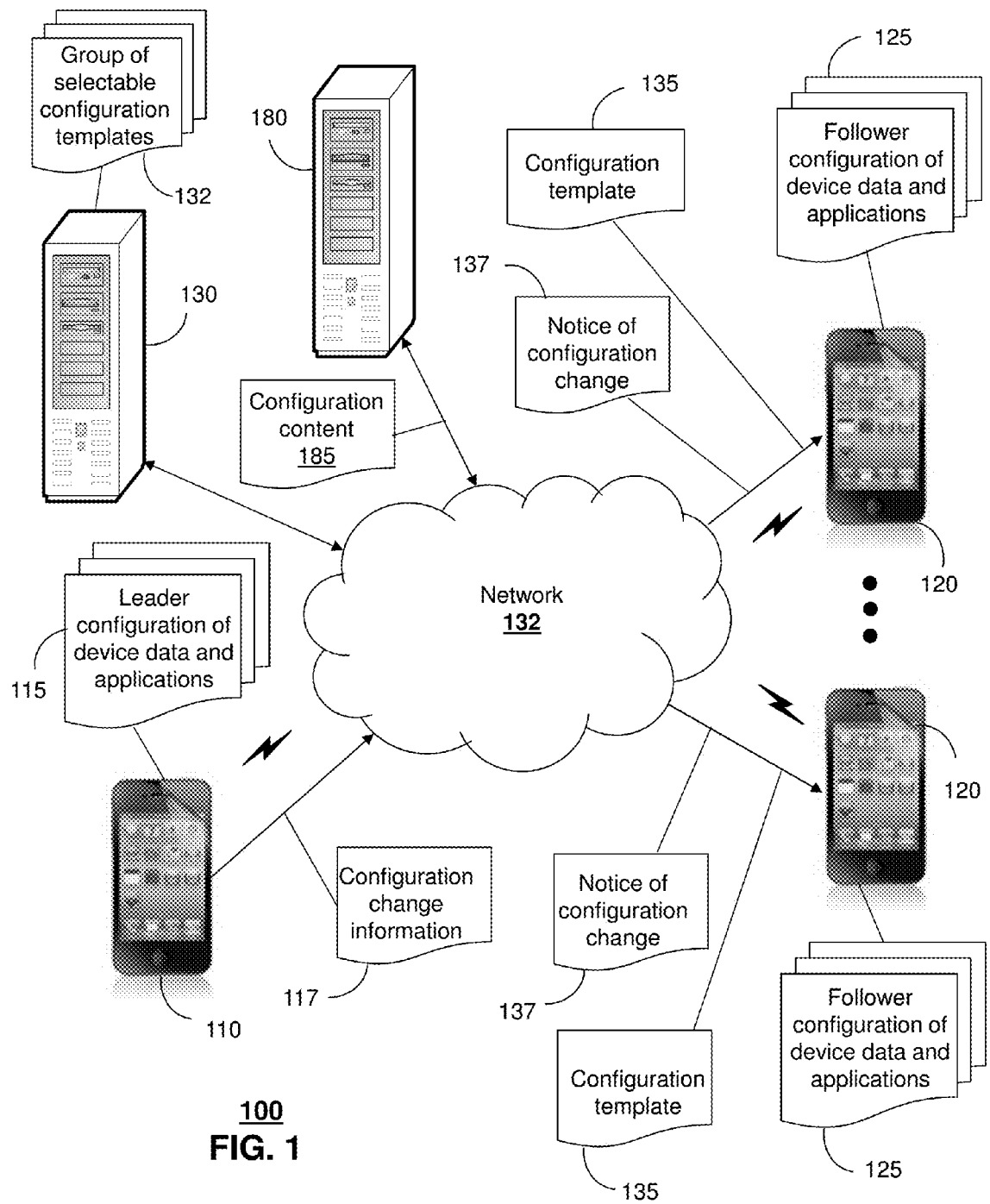
FIG. 1 depicts an illustrative embodiment of a system for managing device configurations utilizing configuration templates.

The subject disclosure describes, among other things, illustrative embodiments of methods and systems for managing the configuration of end user devices through the use of configuration templates generated according to configurations of other end user devices. The configurations (e.g., device data and applications) of the other end user devices can be identified automatically and/or based on user input. These configuration templates can be subject to limitations imposed by various entities such as by the user of a leader end user device (e.g., the device generating the configuration template), by the user of a follower end user device (e.g., the device requesting the configuration template), by a service provider, by a third party providing content for use in a configuration, and so forth. A group of configuration templates, which can be any number of unrelated and/or related templates, can be published or otherwise made available for review by the follower end user device so that one or more configuration templates can be selected. The selected configuration template(s) can then be utilized, in whole or in part, in the provisioning or configuring of the follower end user device. The configuration templates can include instructions or other information that enables the follower end user devices to be provisioned with device data and applications that are associated with the particular configuration template.

In one or more embodiments, the follower end user device can be provisioned or configured based on the selected configuration template(s) in combination with other device data and/or applications, which may be selected by the follower end user device and/or selected by the user of the follower end user device. In one or more embodiments, the follower end user device can select multiple configuration templates for configuring the follower end user device. In this example, conflict resolution can be implemented (e.g., based on user preferences, device capabilities, device accessories, and so forth) where a conflict exists between the selected multiple configuration templates, such as a first configuration template that utilizes first display parameters and a second configuration template that utilizes second display parameters.

In one or more embodiments, changes to the configuration at the leader end user device can be monitored and detected (e.g., by a remote device and/or by the leader end user device) so that the follower end user device(s) has the opportunity to similarly make the configuration changes. As an example, the leader end user device may switch from utilizing a first web browsing application to utilizing a second web browser application as a default browser. This change in configuration can be detected and a notification of the change (e.g., via email, short message service, and so forth) can be provided to the follower end user device to enable reconfiguration of the follower end user device to also switch from the first web browsing application to the second web browser application as the default browser. In one or more embodiments, incentives (e.g., discounted services or products) can be provided to users of the leader end user devices for generating configuration templates that are utilized by other end user devices. In one or more embodiments, the identity of a user of a leader end user device that generates a configuration template can be published or the user identity can be maintained confidential, such as according to the preferences of the user of the leader end user device.

Other embodiments are described in the subject disclosure.

One embodiment of the subject disclosure is a method including receiving, by a first end user device, user input indicating a selection of a configuration template for configuring the first end user device. The configuration template can include device data for the first end user device and can include applications to be provided to the first end user device. The selection of the configuration template can be from among a group of configuration templates, where the configuration template is generated based on a determination that a second end user device is configured with the device data and the applications. The method can include configuring the first end user device according to the configuration template to generate a first configuration of the first end user device. The method can include receiving, by the first end user device, a notification of a configuration change at the second end user device, where the notification is generated based on monitoring for changes to the device data and the applications at the second end user device. The method can include reconfiguring the first end user device according to the configuration change at the second end user device to generate a second configuration of the first end user device.

One embodiment of the subject disclosure is a method that includes initiating, by a second end user device, a template creation process for generating a configuration template associated with the second end user device. The method can include enabling identification of a configuration of the second end user device that includes device data and applications of the second end user device. The method can include presenting, by the second end user device, configuration limitation options for removing a subset of the device data and the applications of the second end user device from the configuration template. The method can include receiving, by the second end user device, user input indicating a selection of the configuration limitation options to generate a limited configuration template associated with the second end user device. The method can include providing, by the second end user device, the limited configuration template to a system including a processor for enabling a first end user device to access the limited configuration template and for enabling the first end user device to be configured according to the limited configuration template. The method can include adjusting, by the second end user device, the configuration of the second end user device. The method can include transmitting, by the second end user device, configuration change information responsive to the adjusting of the configuration, where the transmitting of the configuration change information enables the first end user device to be reconfigured according to the adjusting of the configuration of the second end user device.

One embodiment of the subject disclosure is a method that includes receiving, by a system including a processor, a request for creating a configuration template associated with a second end user device. The method can include identifying, by the system, a configuration of the second end user device that includes device data and applications of the second end user device. The method can include providing, by the system, configuration limitation options for removing a subset of the device data and the applications of the second end user device from the configuration template. The method can include generating, by the system, a limited configuration template associated with the second end user device responsive to a selection of the configuration limitation options, where the limited configuration template does not include the subset of the device data and the applications of the second end user device. The method can include providing, by the system, a first end user device with access to the limited configuration template for enabling the first end user device to be configured according to the limited configuration template. The method can include detecting, by the system, an adjustment to the configuration of the second end user device. The method can include transmitting, by the system to the first end user device, a notification of a configuration change at the second end user device responsive to the detecting of the adjustment, where the transmitting of the notification enables the first end user device to be reconfigured according to the adjustment to the configuration of the second end user device.

FIG. 1 depicts an illustrative embodiment of a system 100 that provides for end user devices generating configuration templates which can be used by other end user devices for configuring or reconfiguring of the other end user devices. The system 100 provides for service bundling by provisioning of device data and applications to the other end user devices utilizing a selection process that is according to the configuration templates. The system 100 also provides for following of a particular leader end user device so that a configuration change, such as new device data or a new application being downloaded to the particular end user device, can be replicated at the follower end user device(s).

The system 100 can include a leader end user device 110, which can be various types of communication devices including a mobile smart phone, a tablet, a laptop computer, a desktop computer, a set top box, an interactive television, a vehicle communication system, and so forth. The leader end user device 110 can have a leader configuration 115 that includes device data and applications stored by or otherwise accessible to the leader end user device 110. The device data of the leader configuration 115 can include device settings (e.g., resolution, brightness, other vision settings, sounds, other audio settings, subtitles, captioning, vibration, icon display, updating, privacy, phone settings, message settings, do not disturb, communication protocols, personal hotspot, airplane mode, camera settings, map settings, and so forth), wallpaper, ringtones, content (e.g., images, audio, video, and so forth), contact information, calendar information and scheduling, default settings (e.g., default browser) and so forth. The applications of the leader configuration 115 can be various type of software applications executable by the leader end user device 110. The system 100 illustrates one leader end user device 110 which is depicted as a mobile smart phone, however, system 100 can have any number of leader end user devices which can be of any type of communication device.

The system 100 can include one or more follower end user devices 120 which can be various types of communication devices including a mobile smart phone, a tablet, a laptop computer, a desktop computer, a set top box, an interactive television, a vehicle communication system, and so forth. The leader end user device 110 and one or more of the follower end user devices 120 can be associated with each other (e.g., family members, friends, co-workers, on the same subscriber plan, and so forth) or can be unassociated with each other (e.g., users do not know each other, users know each other but are not family members or friends, users know each other but are not on the same subscriber plan, and so forth).

The system 100 can also include one or more servers 130, one or more servers 180, and a network 132 that enables wireless and/or wired communication among these various devices and servers via network elements which are not shown (e.g., routers, switches, digital subscriber line access multiplexers (DSLAMs), and so forth). The network 132 can operate according to various protocols to establish communication such as tethered communication technologies (e.g., one or more of coaxial, powerline or phone line wiring), wireless access protocol such as one or more of Wireless Fidelity (WiFi), Bluetooth, Zigbee, or other present or next generation local or personal area wireless network technologies, and/or other wireless technologies such as one or more of Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so forth.

In one or more embodiments, the leader end user device 110 can provide, or otherwise enable access to, the leader configuration 115 or a portion thereof so that a configuration template 135 can be generated. As an example, the leader end user device 110 can access a configuration website, such as managed via server 130 by a service provider associated with services being provided to the leader end user device 110, to allow a template engine to query the leader end user device 110 for, or otherwise detect, various device data and applications that make up the leader configuration 115. The identification of the leader configuration 115 can be performed without or without user intervention.

For example in one embodiment, after the template engine has attempted to detect the device data and applications, the user of the leader end user device 110 can be prompted to confirm any questions with respect to the detection of the leader configuration 115, such as in the event that the template engine has detected an unidentifiable application stored by the leader end user device 110. In other embodiments, the detection or querying process can be performed automatically such that the user does not provide any user input to assist in identifying aspects of the leader configuration 115.

In another embodiment, a configuration application resident on the leader end user device 110 can be initiated for generating the configuration template 135. The configuration application of the leader end user device 110 can generate the configuration template 135 and/or can interact with server 130 for generating the configuration template. For instance, the configuration application of the leader end user device 110 can identify all of the device data and applications which are to be included in the configuration template 135 and can then provide that information to the server 130 for generation of an accessible configuration template. In another embodiment, the configuration application of the leader end user device 110 can establish a communication session with the server 130 so that configuration queries can be received from the server 130 and responses to those queries can be provided by the leader end user device.

In one or more embodiments, the generation of the configuration template 135 from the leader configuration 115 of the leader end user device 110 can be subject to limitations or restrictions derived from various sources, such as the leader end user device 110, a user of the leader end user device, a service provider associated with the leader end user device, a subscription plan associated with the leader end user device, a third party entity providing content and/or applications that are utilized in the leader configuration 115, and so forth. For example, the leader configuration 115 can include contact information such as personal contacts, business contacts, and public contacts (e.g., government contact information, public corporation contact information, and so forth). A user of the leader end user device 110 may desire to keep confidential all or some of the contact information such as maintaining personal and business contacts as confidential but sharing public contacts). In another embodiment, the particular contact may desire to maintain confidentiality. In this example, a flag or other metadata associated with the particular contact can be stored by the leader end user device 110 and analyzed (e.g., by the leader end user device during the configuration template generation process) to determine that the particular contact is not to be included as part of the contact information that is shared via the configuration template. Other restrictions or limitations can be utilized to remove particular device data and/or applications from the configuration template, such as Digital Rights Management (DRM) data corresponding to content and/or applications stored by the leader end user device 110.

The server 130 can publish, or otherwise make accessible, the generated configuration template 135, along with other configuration templates to form a group of configuration templates 132. The group of configuration templates 132 can be generated by or from a single leader end user device 110 or multiple leader end user devices. In one or more embodiments, the server 130 can provide notifications (e.g., via email, SMS, social network posting) to particular end user devices that indicate that the leader end user device 110 has generated the configuration template 135. For example, the user of the leader end user device 110 can designate particular devices that are to be notified that the configuration template 135 has been generated. The means of notification can be selected by the user and/or selected by the server 130 (e.g., based on presence information, monitored historical behavior of the particular end user devices for receiving such notification, and so forth). In one or more embodiments, the configuration template 135 can be published to a template catalogue which provides public access or private access (e.g., according to a selection by the user of the leader end user device 110). In another embodiment, authentication of end user devices to enable access to the configuration template 135 can be controlled by the leader end user device, such as each access request requiring approval by the leader end user device 110 or the methodology of authentication being designated by the leader end user device.

In one or more embodiments, the follower end user device(s) 120 can select the configuration template 135 from among the group of configuration templates 132. The template selection process can be initiated in a number of different ways, such as at a time of purchase upon initial start-up which establishes a communication session with the server 130 or access to a configuration website, in response to a notification received which includes a link that enables viewing and selection from among the group of configuration templates 132, and/or initiating execution of a configuration application resident on the follower end user device 120 which provides access to the group of configuration templates.

The configuration template 135 can enable the follower end user device 120 to be provisioned or otherwise configured based on the device data and applications of the configuration template 135, in whole or in part, to provide the follower configuration 125 at the follower end user device 120. As an example, the configuration template 135 can include instructions executable by the follower end user device 120 that facilitates the configuration process, such as automatically downloading all or a portion of the device data and applications designated in the configuration template 135. The configuration template 135 can also include instructions that enable the follower end user device 120 to change device settings according to the device settings designated in the configuration template 135, such as changes to one or more of resolution, brightness, other vision settings, sounds, other audio settings, subtitles, captioning, vibration, icon display, updating, privacy, phone settings, message settings, do not disturb, communication protocols, personal hotspot, airplane mode, camera settings, map settings, and so forth at the follower end user device 120. In one or more embodiments, the configuration template 135 can provide a link or access to purchasable content and/or applications (designated by the configuration template 135) so that the follower end user device 120 can purchase and download the content and/or applications.

In one or more embodiments, the configuration template 135 can direct or otherwise facilitate the follower end user device 120 to establish a communication session with the server 180 for obtaining configuration content 185 associated with the configuration template 135. The configuration content 185 can be of various types including images, video, audio, wallpaper, ringtones, applications, and so forth. The server 180 can be operated by the same service provider operating the server 130 or can be operated by a third party entity that is independent of the service provider. The configuration content 185 can be free content or can be purchasable content. The purchasing of content can be performed in a number of different ways, including credit cards, charges to a service provider bill, and so forth. In one embodiment, third party configuration content included in the configuration template 135 can be purchased via the server 180 and the fee for the purchase can be included in a service bill generated by the service provider that also includes fees for other services being provided to the follower end user device 120.

In another embodiment, the use of configuration templates can be according to an incentive process that rewards the leader end user device 110 responsive to one or more follower end user devices 120 utilizing the particular configuration template generated by that leader end user device 110. The rewards can be of various types, such as a free or discounted services and/or products, free or discounted content and/or applications, public recognition, free or discounted advertising, and so forth.

In one or more embodiments, the generation of the follower configuration 125 by the follower end user device 120 according to the configuration template 135 can be subject to limitations or restrictions derived from various sources, such as the follower end user device 120, a user of the follower end user device, a service provider associated with the follower end user device, a subscription plan associated with the follower end user device, a third party entity providing content and/or applications that are utilized in the follower configuration 125, and so forth.

For example, the configuration template 135 can include wallpaper, ringtones, and/or content that the user of the follower end user device 120 does not desire to have provisioned to the follower end user device. In one embodiment, the provisioning of the follower end user device 120 can be performed after a confirmation from the user of the follower end user device 120 is received for some or all of the device settings and/or applications that are included in the configuration template 135. In another embodiment, an application included in the configuration template 135 may have a rating that is inappropriate for the user of the follower end user device 120 (e.g., based on parental controls in a subscriber plan) which can cause the follower end user device to reject the provisioning of that particular application.

In one embodiment, the follower configuration 125 can be generated based on all or a portion of the configuration template 135, in conjunction with other device settings and/or applications selected by the follower end user device 120 and/or selected by the user of the follower end user device 120. For instance, a user can be provided with additional configuration options that enable additional device data, applications and/or accessories to be provisioned to the follower end user device 120. The additional configuration options can be generated based on a review (e.g., by the follower end user device 120 and/or by the server 130) of the device data and applications included in the configuration template 135. In one embodiment, this review to identify additional configuration options can be performed in conjunction with a master list of available device data and applications, such as an aggregation of all of the device data and applications of the group of configuration templates 132. In another embodiment, the additional configuration options can be generated based on other factors, such as monitored user behavior or consumption history for the follower end user device 120, demographics for the user of the follower end user device 120, user preferences, and so forth. Other restrictions or limitations can also be utilized to remove particular device data and/or applications from the follower configuration 125, such DRM data corresponding to content and/or applications for which the follower end user device 120 does not have a license or authorization for use.

In one embodiment, the follower configuration 125 can be generated based on selection of multiple configuration templates 135, at the same time or at different times, by the follower end user device 120 and/or by the user of the follower end user device 120. The selection of multiple configuration templates can result in conflicts as to which device settings and/or applications are to be utilized. The follower end user device 120 can include a conflict resolution process which is initiated responsive to detecting a conflict. In one embodiment, the conflict resolution process can be performed with or without user intervention, such as based on one or more of monitored user behavior or content consumption, user preferences, device capabilities, costs, compatibility with other aspects of the follower configuration 125, and so forth.

In one or more embodiments, changes to the leader configuration 115 at the leader end user device 110 can be monitored so that a notice of configuration change 137 is provided to any follower end user devices 120 that selected the corresponding configuration template 135 of that leader end user device 110. In one embodiment, the leader end user device 110 can provide configuration change information 117 which identifies the device data and/or applications that have been changed. The configuration change information 117 can be provided to the server 130 for distribution of the notice of configuration changes 137 to the appropriate follower end user devices 120 that are following that leader end user device 110. In another embodiment, the configuration change information 117 can be provided directly to the appropriate follower end user devices 120 that are following that leader end user device 110. The configuration changes can include adding or deleting device data and/or applications, changing device settings, changing default programs, changing ringtones, changing wallpaper, adding or deleting contact information, and so forth.

In one embodiment, the configuration change information 117 can be provided by the leader end user device 110 to the server 130 for any changes to the leader configuration 115, and the server 130 can then determine if a follower end user device 120 requires notification of the configuration change. As an example, the leader configuration 115 can be changed by a user of the leader end user device 110 by adding a new friend to the personal contacts stored by the leader end user device. The leader end user device 110 can transmit the configuration change information 117 (which is indicative of the new personal contact) to the server 130. The server 130 can determine that a first follower end user device 120 should receive the notice of configuration change 137 because the first follower end user device was provisioned with the configuration template 135 including the original personal contacts stored by the leader end user device 110. The server 130 can also determine that a second follower end user device 120 should not receive the notice of configuration change 137 because even though the first follower end user device was provisioned with another version of the configuration template 135, that other version did not include the original personal contacts stored by the leader end user device 110 (e.g., the user of the leader end user device 110 chose to share the personal contacts with the first follower end user device 120 but not with the second follower end user device). While this example describes a configuration change to contact information of the leader configuration 115, the exemplary embodiments can include providing one or more follower end user devices 120 with information indicating changes to various device data and/or applications.

In one or more embodiments, the notice of configuration change 137 can include data or instructions (e.g., a link to new device data and/or applications, software instructions for adjusting a device setting, and so forth) to facilitate the provisioning of the follower end user device 120 according to the change made to the leader configuration 115 at the leader end user device 110. In one or more embodiments, implementation of the change to the follower configuration 125 according to the notice of configuration change 137 can be based on user authorization at the follower end user device 120. For example, certain types of configuration changes to the follower configuration 125 can require user input authorizing the change (e.g., a prompt is presented at the follower end user device 120 indicating the nature of the configuration change and requesting user authorization to proceed) while other types of configuration changes to the follower configuration 125 can be automatically performed based on prior authorization (e.g., an authorization stored in user preferences at the follower end user device 120 based on the type of device data and/or application being changed).

The system 100 allows users of communication devices to share what is on their device more broadly, as well as the ability to receive notifications and "follow" the customization of users of their choice. The system 100 also enables end user devices to utilize a configuration application for developing and "following" configuration templates (or profiles) such as of a friend, celebrity, and/or family member in order to provide them with rapid access to the ringtones, wallpapers, accessories, contacts, etc. that they want to expose on their device. The system 100 also allows users to be notified when someone they follow makes a physical (e.g., accessory) and/or virtual (e.g., application, wallpaper, ringtone) change to their device and then gives them an easy pathway to mimic those changes on their device leveraging existing channels and workflows that are already in place.

In one embodiment, the system 100 allows users to customize and configure communication devices (e.g., mobile smart phones) as they desire prior to first use and delivery without requiring an item by item selection of device data and applications. The system 100 can be used to choose an end user device, customize the look and feel of the end user device, and choose and pre-load applications, images, sounds, settings (e.g., policy management), and so forth. In this example, when customers receive their communication device, it can already be loaded and configured in the way they want it based on a configuration template generated by or from another end user device. In one embodiment, preloaded personas or settings for social networking, photo bugs and gaming can be provided for the end user device.

Figure 2:
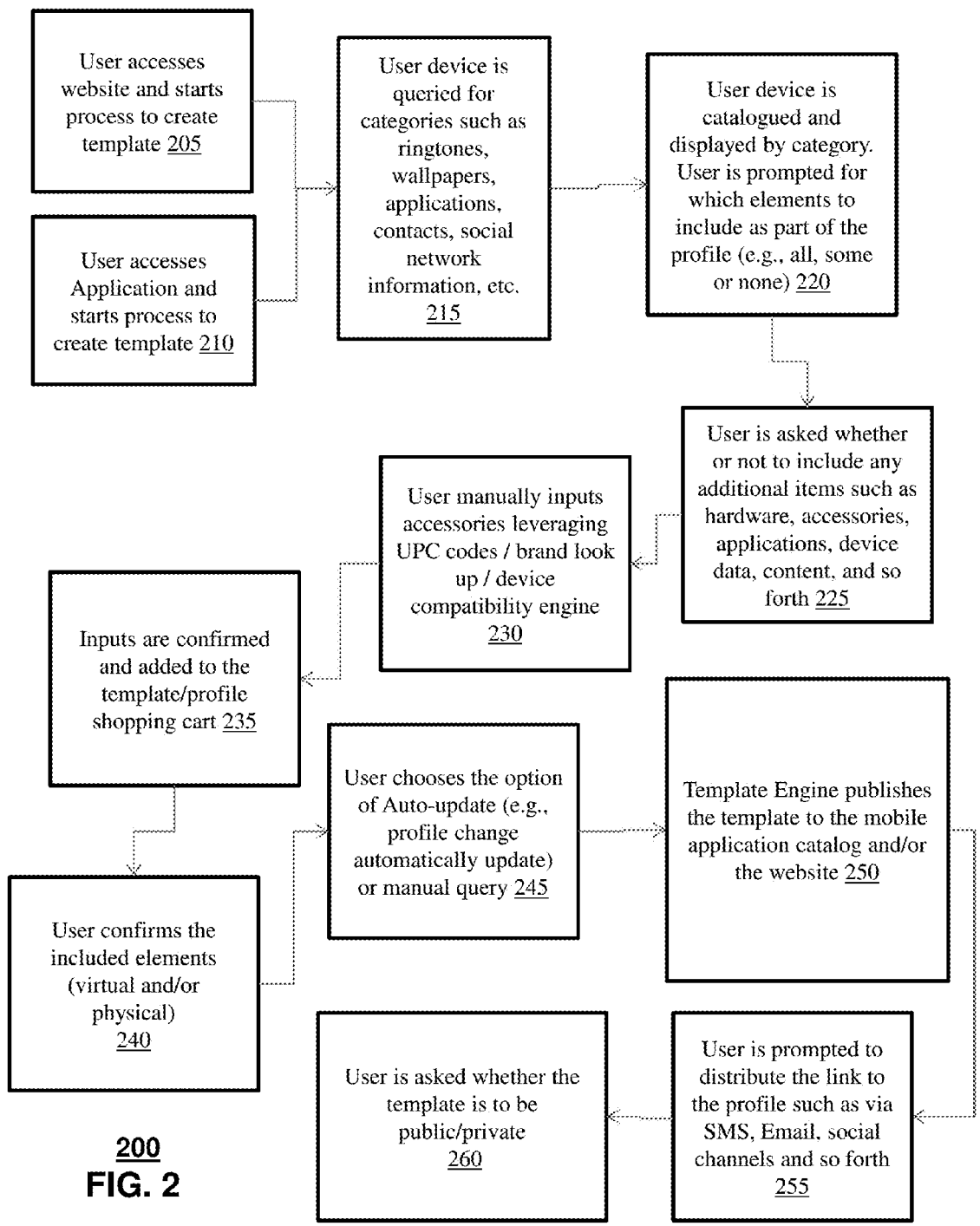
FIGS. 2-7 depict illustrative embodiments of methods used in portions of the system of FIG. 1 for managing device configurations utilizing configuration templates.

FIG. 2 illustrates an exemplary method 200 for creating a leader template. Method 200 can begin at 205 with a configuration website being accessed, such as by leader end user device 110 or another device associated with the leader end user device, or can begin at 210 with a configuration application being accessed, such as a configuration application resident on the leader end user device 110. At 215, the leader end user device 110 can be queried (or other detection techniques applied) to identify the device data and applications that make up the leader configuration 115. In one embodiment at 220, the device data and applications can be catalogued (or otherwise categorized or arranged) and presented so that a user can select or remove device data and applications to be used in the configuration template 135.

At 225-240, the method 200 enables supplementing of the configuration template 135 with additional device data, applications, and accessories that are not presently part of the leader configuration 115. At 245, the user is given the option as to how template changes are to be processed. At 250-260, the method 200 enables publication and distribution to other end user devices, either publicly or privately via various means including email, social network postings, SMS messages, and so forth.

Figure 3:
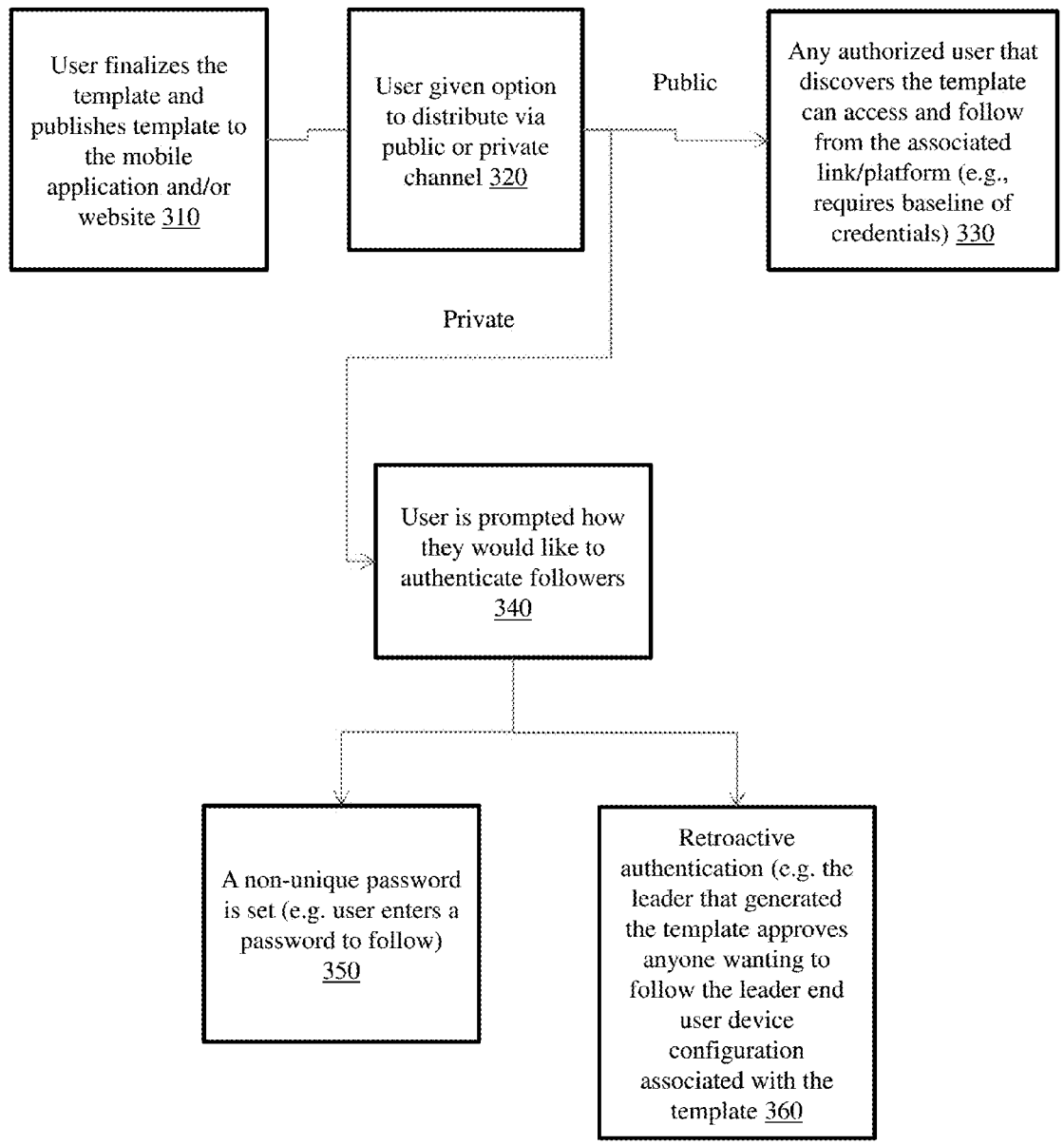

FIG. 3 illustrates an exemplary method 300 for controlling the distribution of the configuration template 135. At 310-320, upon finalizing the generation of the configuration template 135, the user can select distribution via a private or public channel. For instance, at 330 via a public channel, any end user device (e.g., possesses the configuration application) that discovers the template can access and select the particular configuration template 136 (to become a follower of the leader end user device 110), such as utilizing a baseline of credentials. As another example, at 340-360 via a private channel, a user can designate how follower end user devices are to be authenticated, such as using passwords or retroactively.

Figure 4:
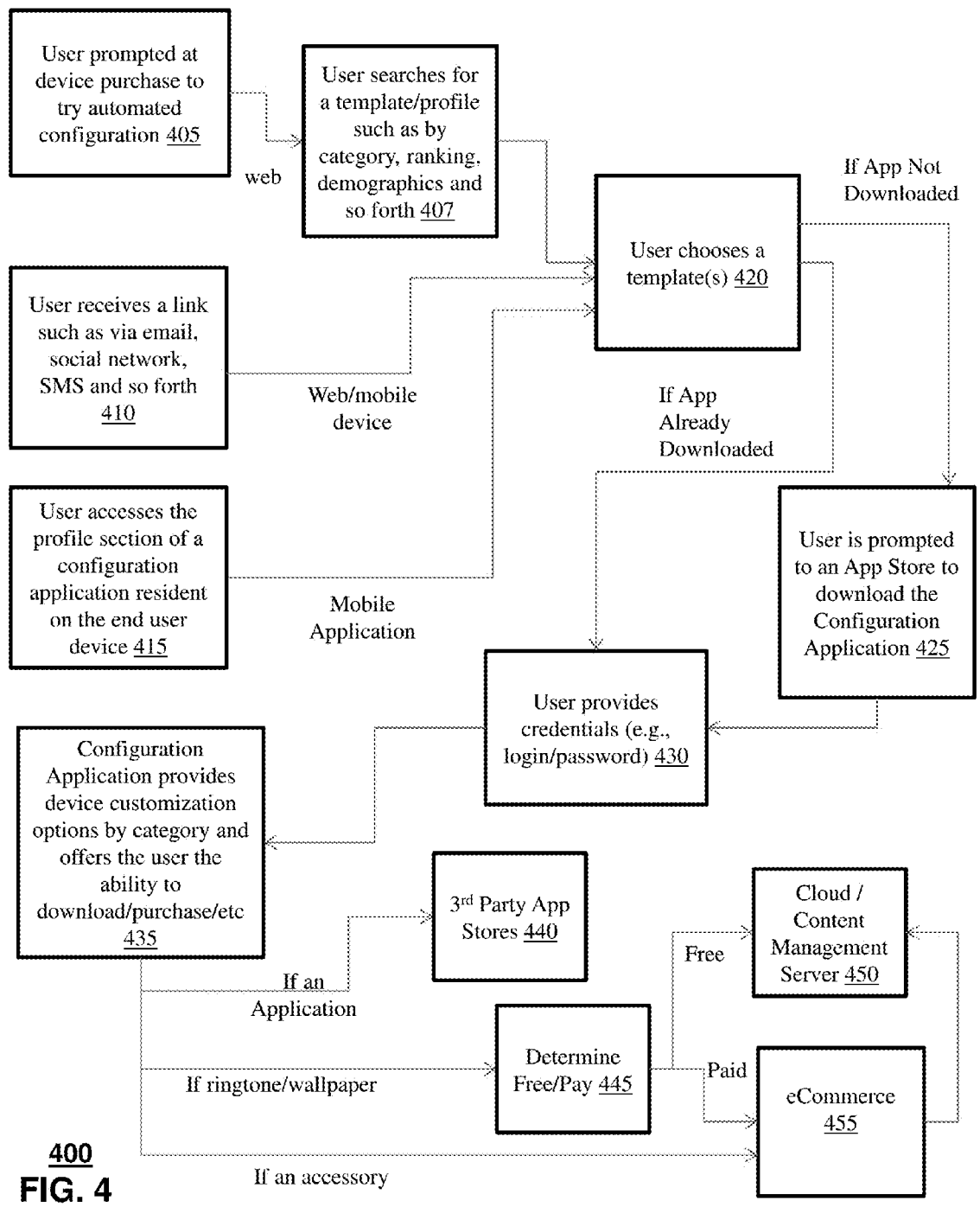

FIG. 4 illustrates an exemplary method 400 for selecting a configuration template and enabling following of the leader configuration 115 of the corresponding leader end user device 110. At 405-410, the follower end user device can initiate the selection process, such as at initial start-up, responsive to a received message containing a configuration link, and/or accessing a selection section of a configuration application resident on the follower end user device 120. At 420, the configuration template 135 can be selected from among the group of configuration templates 132. At 425-430, the configuration application can be purchased (if not already done) and initiated. At 435-455, selection options can be provided that include the group of configuration templates 132, as well as additional device data, applications, and accessories that can be provisioned to the follower end user device 120. These selection options can include purchasable items, such as applications from a third party application store.

Figure 5:
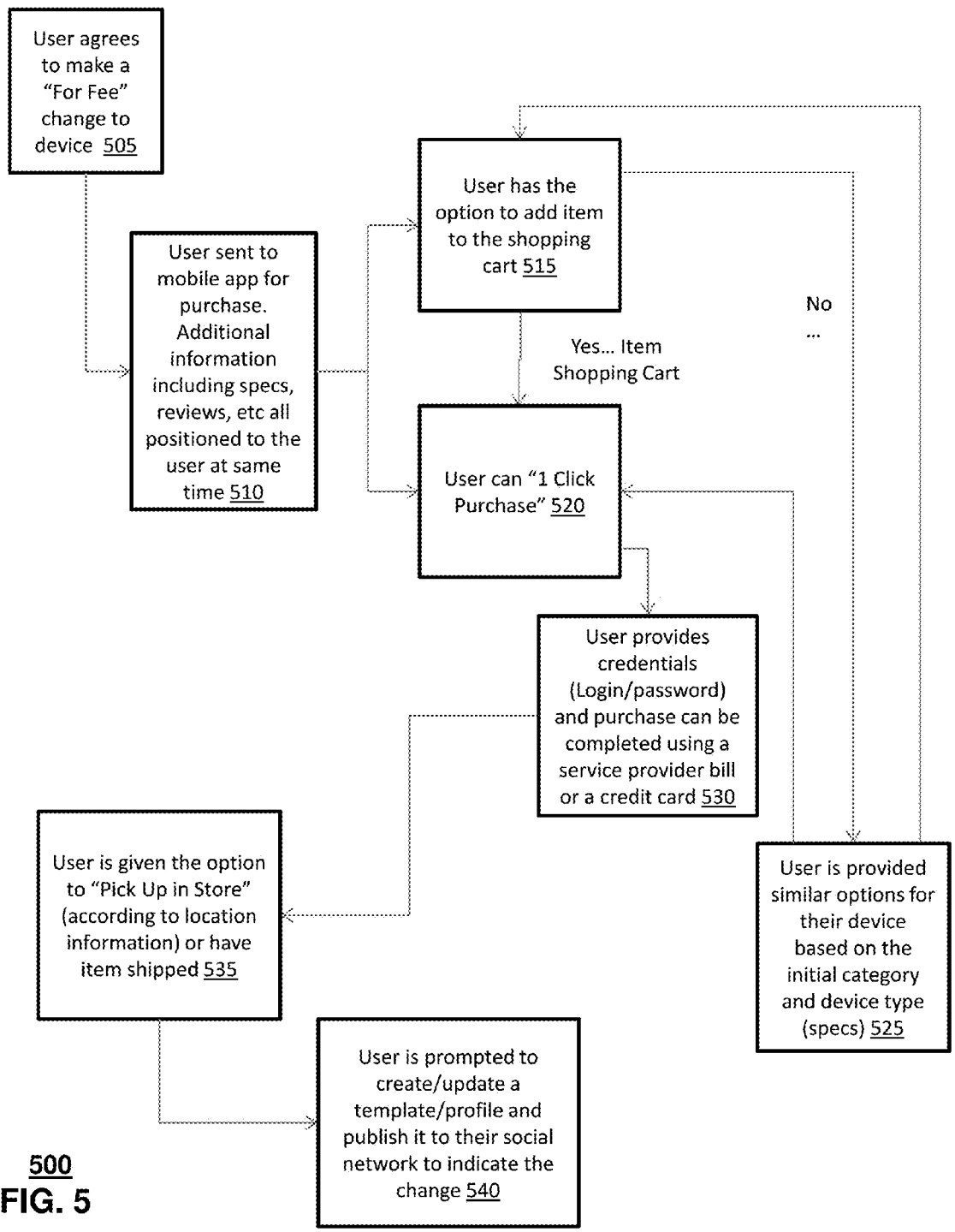

FIG. 5 illustrates an exemplary method 500 for an end user device to purchase device data and/or applications as part of the configuration process. At 505-510, a user of an end user device can agree to purchase device data, applications and/or accessories that are part of a selected configuration template 135, that are to be included in a configuration template 135 that is being generated, or are additional items for provisioning to follower end user device(s) 120. The configuration application of the end user device can provide various information associated with, or describing, the item(s) to be purchased, such as descriptive information obtained from server 130. At 515-535, the purchase process can include a "one click purchase" or can be purchased via another technique. The purchase can also be performed via shipping or an in-store pick up, such as where the purchased item is an accessory for the follower end user device 120. In one embodiment at 540, the user of a leader end user device 110 can be prompted, responsive to the purchase, to update the configuration template 135 with this purchased device data, application and/or accessory for publishing of the updated configuration template. The accessory can be various types of hardware items, such as memory, a peripheral device, a printer, a case, and so forth.

Figure 6:
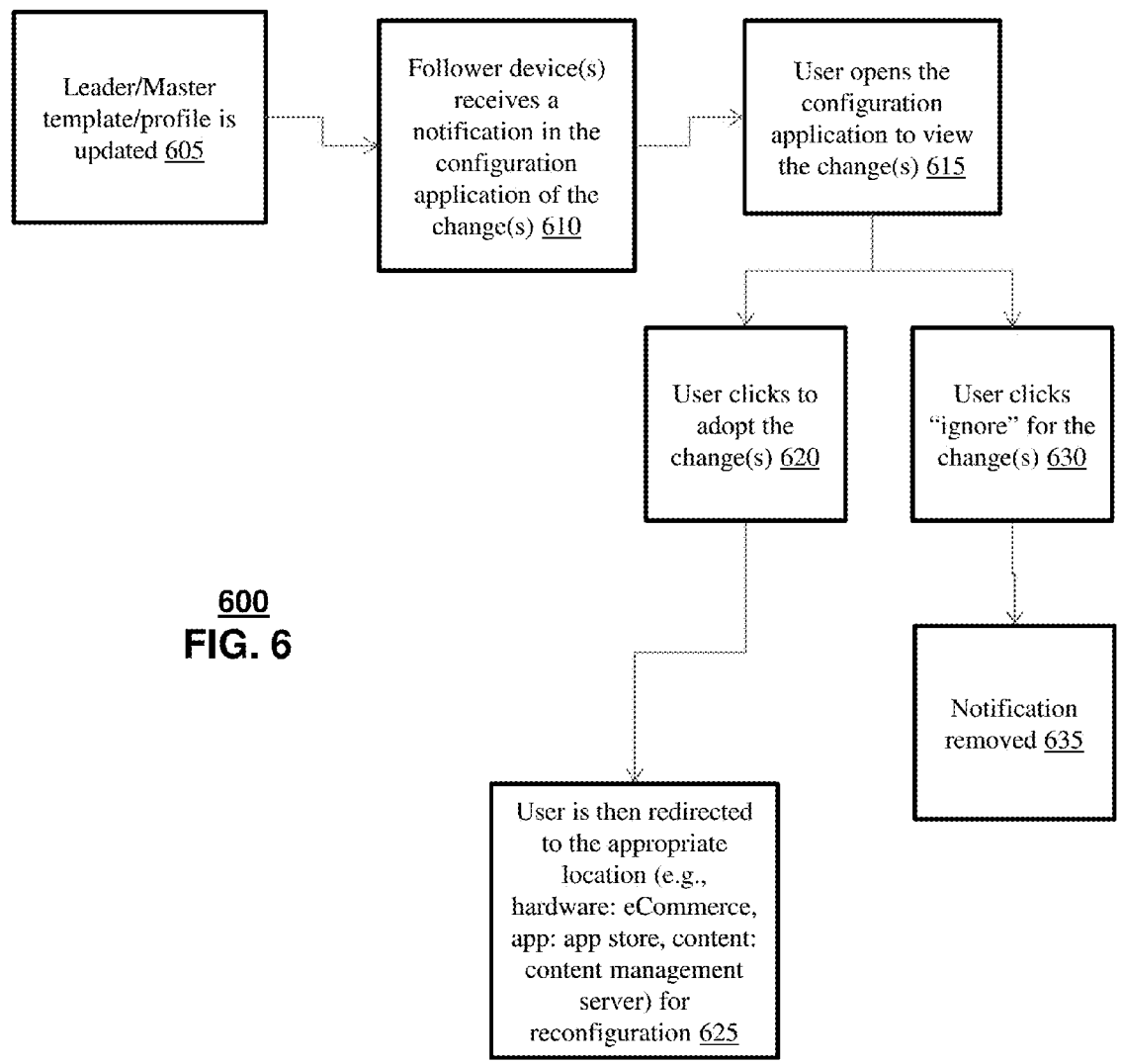

FIG. 6 illustrates an exemplary method 600 for a follower end user device 120 to follow a leader configuration 115 of a leader end user device 110 so that the follower configuration 125 of the follower end user device 120 can be changed based on changes to the leader configuration 115. At 605, the leader configuration 115 can be updated, such as a user downloading new contact information, wallpaper, ringtones, applications or adjusting device settings. In one embodiment, the configuration change at the leader end user device 110 can be changes that do not require downloading items, such as switching between different ringtones or different wallpaper that is stored by the leader end user device 110 or changing default programs, such as a default web browser. At 610, a notice of configuration change 137 can be received by one or more follower end user devices 120 responsive to a detection of the change at step 605. The notice of configuration change 137 can be distributed by various devices, such as directly by the leader end user device 110, by the server 130, or by a combination of both. At 615-635, the configuration change may or may not be implemented at the follower end user device(s) 120. For instance, a link or other actuation mechanism can be included in the notification of configuration change 137 to initiate the reconfiguration at the follower end user device. As an example where the configuration change at the leader end user device 110 is the downloading of a new application that is utilized for navigation, the notification of configuration change 137 can include a description of the navigation application and a link which, when actuated (e.g., via a single click), downloads the navigation application, such as without any further user intervention other than the single click. In other embodiments, the notification of configuration change 137 can include a description of the item from the configuration change and a link which, when actuated, redirects a web browser to a website for accessing the item (e.g., downloading content or applications, obtaining an accessory, and so forth). In another embodiment, the notification of configuration change 137 can include a description of the item from the configuration change and a button which, when actuated, deletes or otherwise removes the notification from the follower end user device.

Figure 7:
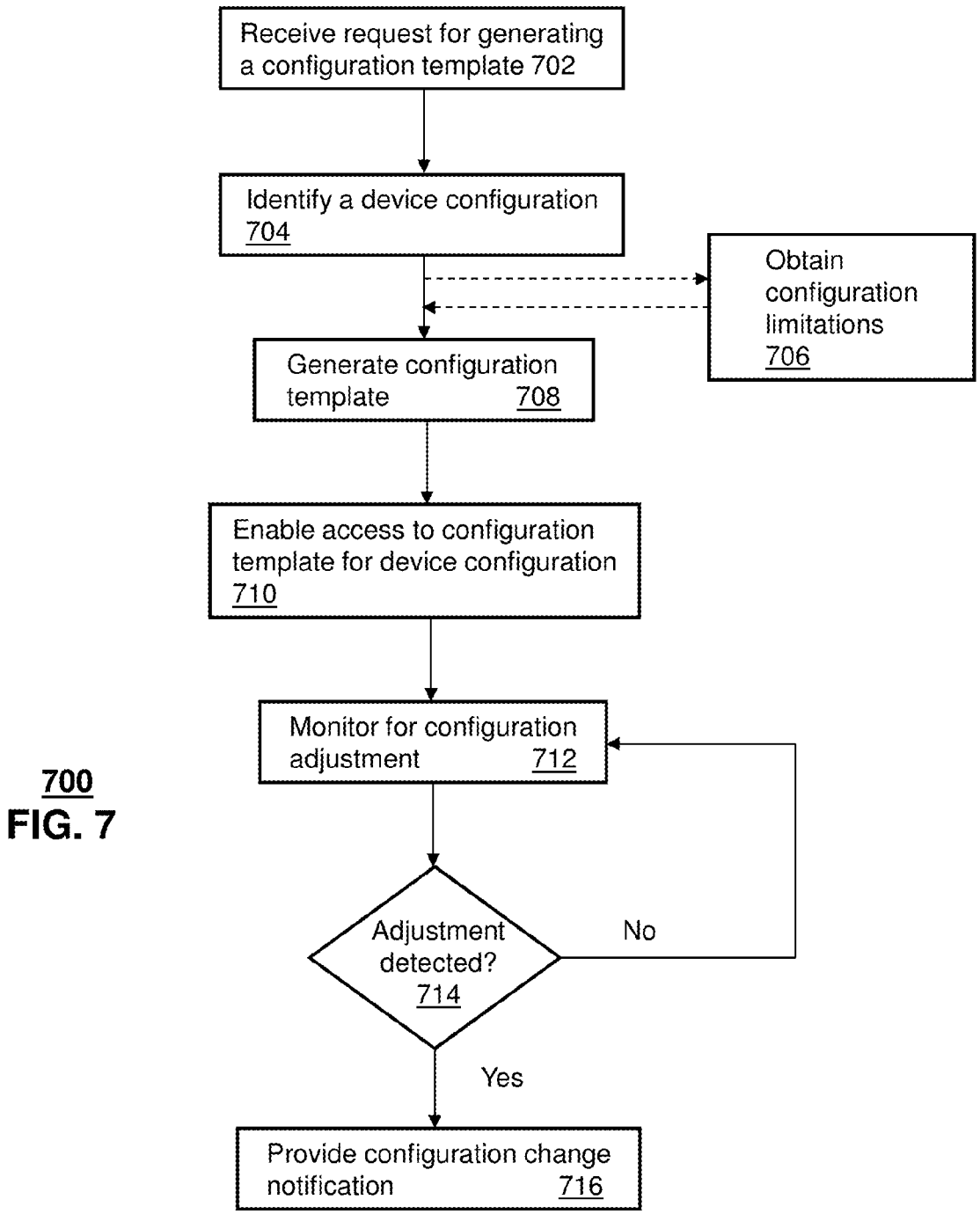

FIG. 7 depicts an illustrative embodiment of a method for managing device configuration utilizing configuration templates generated by other device(s). Method 700 can be performed, in whole or in part by various devices or combinations of devices, including being performed by a network server and/or a mobile communication device. At 702, a system, which includes a processor, can receive a request for creating a configuration template associated with a leader end user device. The type of end user device can vary and can include mobile smart phones, tablets, desktop computers, laptop computers, vehicle computing devices, set top boxes, and so forth. The request can be received from the leader end user device, such as based on user input at the leader end user device. The request can also be received from another device, such as where a user desired to generate a configuration template according to his or her smart phone and is accessing a website, managed by the system, via his or her laptop computer. At 704, a device configuration of the leader end user device can be identified or otherwise determined. The device configuration can be identified based on querying of the leader end user device for categories associated with configurations, such as ringtones, wallpaper, applications, contact information, social networking data, and so forth. The identified configuration can include device data (including device settings) and/or applications stored by, or otherwise accessible to, the leader end user device.

At 706, configuration limitation options can be presented and selected (e.g., at a display of the leader end user device or in a website being utilized for generating the configuration template) for removing a subset of the device data and the applications of the second end user device from the configuration template. As an example, the subset removed from the configuration template can be one or more applications that the user of the leader end user device does not desire to share with others. As another example, all or a portion of contact information stored by the leader end user device can be designated in the subset so that it is not shred in the configuration template. The subset that is to be removed from the configuration template can be device data, applications or both. In one embodiment, the configuration limitations can be based on user preferences, service provider policies or other rules. In another embodiment, the configuration limitations can be in whole or in part based on user input selections of the configuration limitation options.

At 708, a limited configuration template associated with the second end user device can be generated, such as responsive to a selection of the configuration limitation options. The limited configuration template may not include the subset of the device data and the applications of the second end user device that the user (via user input, user preferences, service provider policies, and so forth) has requested to be removed from the configuration template. At 710, a follower end user device can be provided with access to the limited configuration template for enabling the first end user device to be configured according to the limited configuration template. The access and provisioning of the follower end user device according to the limited configuration template can be performed in a number of different ways. For instance, a link to the limited configuration template can be provided to the follower end user device such as through email, SMS, social network(s), and so forth. In another embodiment, the access can be provided via a website. In one embodiment, the access can be provided at or near the time of purchase of the follower end user device, such as providing the user of the follower end user device with a group of configuration templates to review and select from among. This review and selection process can be part of an initial start-up procedure for the follower end user device, or can be accessed at another time. In one embodiment, permission for the follower end user device to access the limited configuration template must be issued by the leader end user device before the access at 710 is enabled.

In one embodiment, the configuration of the follower end user device according to the limited configuration template can be subject to further restrictions, such as restriction provided by the user of the follower end user device, service provider rules and policies, parental controls (e.g., as part of a subscriber agreement) and so forth. As an example, a limited configuration template can include multiple wallpaper and/or multiple ringtones for storage at the follower end user device. The user of the follower end user device can select which of the wallpaper and/or ringtones to be implemented at the device and can delete wallpaper and/or ringtones that the user does not desire to store. In another embodiment, the limited configuration template can include multiple applications, but a subset of those applications can be rendered inoperable or prevented from being downloaded to the follower end user device, such as based on a parental control included in a subscriber agreement associated with the follower end user device.

At 712, monitoring for adjustments to the configuration of the leader end user device can be performed. The monitoring can be limited to aspects of the configuration that are included in the limited configuration template. For example, a limited configuration template can include all applications stored on the leader end user device but can exclude any contact information stored on the leader end user device. Continuing with this example, an addition or deletion to or from the leader end user device of an application can be monitored and detected, while an addition or deletion to or from the leader end user device of contact information would not be monitored. The particular technique utilized for monitoring and detecting configurations can vary, including the leader end user device storing particular categories of device data and applications that are to be monitored, and then providing a notice to a network server upon detection of a change to one of the particular categories.

If at 714 an adjustment to the configuration of the leader end user device being monitored is detected, then method 700 can proceed to 716 to provide a notification of a configuration change to the follower end user device to enable the follower end user device to reconfigure based on the detected adjustment. The reconfiguration of the follower end user device can be performed in various ways, such as providing a message with a single link that enables downloading and reconfiguration. In one embodiment, the reconfiguration may involve purchasing content (e.g., wallpaper, ringtones, applications, media items, and so forth). For instance, a message with a link to a source for purchasing the content can be transmitted to the follower end user device responsive to the detection of the adjustment to the configuration of the leader end user device being monitored. The source can be an ecommerce source of the service provider or an ecommerce source of a third party that is a distinct entity from the service provider. In one embodiment, the reconfiguration of the follower end user device can be subject to restrictions by the user of the follower end user device, service provider policies and rules, user preferences and so forth. For example in one embodiment, prior to the reconfiguration being implemented at the follower end user device, user input authorizing the reconfiguration would be received at the follower end user device.

In one embodiment, method 700 can provide for incentives for the generating of configuration templates. For instance, a financial incentive (e.g., a discount on services, a trial membership for a service, coupons, and so forth) can be provided to a leader end user device when a threshold number of follower end user devices are configured according to the limited configuration template generated by the leader end user device.

In one embodiment, the configuration change at the leader end user device 110 can include obtaining content for use in configuring the leader end user device, where the reconfiguring of the follower end user device 120 includes providing the device 120 with access to purchase the content. In one embodiment, the configuration template can be limited (e.g., by a user, by a service provider, or by a third party) to a subset of device data and applications of the leader end user device 110. In one embodiment, the device data of the configuration template can include a subset of contact information stored at the leader end user device 110, such as according to contact information sharing rules generated by a user of the device 110. In one embodiment, the reconfiguring of the follower end user device 120 can include providing the device 120 with a single link for downloading content and/or application(s), as well as initiating the reconfiguring.

In one embodiment, the follower end user device 120 can access a website that publishes a group of configuration templates (generated by one or more leader end user devices 110) and can present configuration options representative of the group of configuration templates. In one embodiment, the follower end user device 120 can receive other user input indicating another selection of another configuration template for configuring the device 110, where the other configuration template includes other device data for the device 110 and includes other applications to be provided to the device 110. In this example, the other selection of the other configuration template is from among the group of configuration templates, and the other configuration template is generated based on another determination that another leader end user device 110 is configured with the other device data and the other applications. A conflict can be identified, such as by the follower end user device 120, between the configuration template and the other configuration template. The conflict can be resolved by the follower end user device 120, with or without user input, to identify a third configuration for the follower end user device 120. In one embodiment, the resolving of the conflict can be based on user preferences associated with the first end user device. In another embodiment, conflict resolution can be applied by the follower end user device to configuration changes by a leader end user device, such as where a follower end user device is following multiple leader end user devices.

Figure 8:
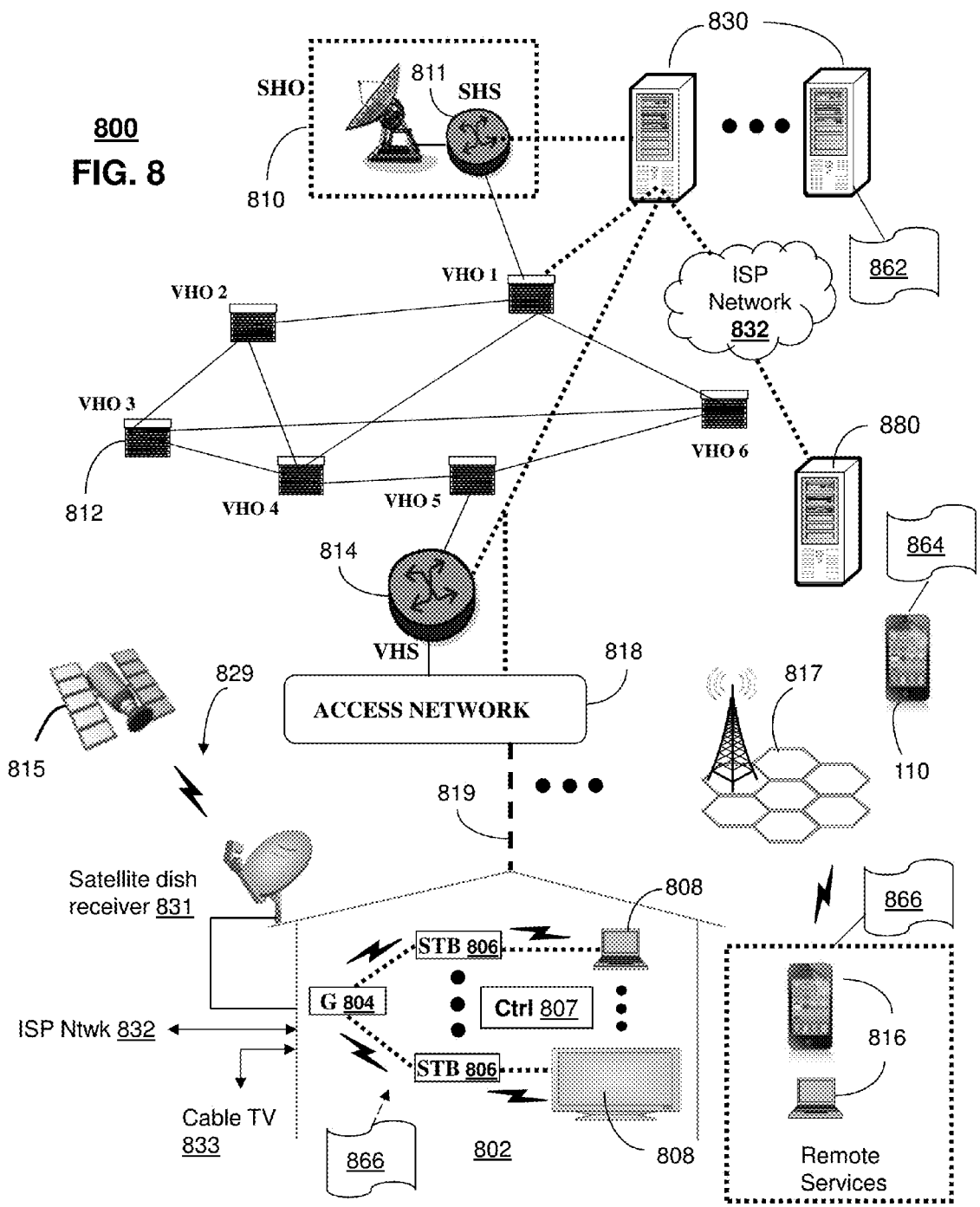
FIG. 8 depicts an illustrative embodiment of a communication system that provides media services and management of device configurations utilizing configuration templates.

FIG. 8 depicts an illustrative embodiment of a communication system 800 for delivering media content and enabling automatic configuration and reconfiguration of end user devices, such as mobile smart phones. The communication system 800 can represent an Internet Protocol Television (IPTV) media system. Communication system 800 can be overlaid or operably coupled with the system 100 as another representative embodiment of communication system 800.

The system 800 enables a configuration template(s) to be generated based on all or a portion of a configuration (e.g., device settings, content, wallpaper, ringtones, applications, and so forth) of a leader end user device(s). The system 800 enables a follower end user device(s) to be configured based on the configuration template, which may be selected from among a group of templates that are made available for review such as via a website or through a configuration application resident on the follower end user device. The follower end user device can further customize the configuration such as by utilizing only a portion of the configuration template, by using multiple configuration templates, and/or by provisioning with other device data and/or applications that were not included or otherwise designated in the selected configuration template.

The system 800 enables changes to a configuration of a leader end user device to be detected so that a notice of the configuration change can be provided to any number of follower end user devices that were configured based on a configuration template generated from that leader end user device. In this embodiment, the notice of the configuration change can cause or otherwise facilitate (e.g., via a link)

reconfiguration of the follower end user device to mimic or otherwise follow the configuration change that occurred at the leader end user device. The reconfiguration process can be provided via a single link that causes the reconfiguration (e.g., downloading of a new ringtone or new application). The reconfiguration process can be provided via a link to a source for purchasing content that is part of the configuration change. For instance, if the leader end user device purchases and downloads a new application, then the notice of configuration change can provide a link to an application store for purchasing and downloading the new application.

The IPTV media system can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol.

The VHS 814 can distribute multimedia broadcast content via an access network 818 to commercial and/or residential buildings 802 housing a gateway 804 (such as a residential or commercial gateway). The access network 818 can represent a group of DSLAMs located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as WiFi, Bluetooth, Zigbee, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a configuration server (herein referred to as server 830). The server 830 can use computing and communication technology to perform function 862, which can include among other things, determining a configuration of the leader end user device 110 (e.g., cataloguing device data and applications), providing limitation options for removal of particular device data and/or applications from the configuration template, providing options for limiting or otherwise controlling accessibility to the configuration template, providing options as to how follower end user devices are to be authenticated, and generating the configuration template. Function 862 can also include monitoring or otherwise detecting a change in configuration to the leader end user device 110 (e.g., a change to a category of device data and/or applications that was made part of a configuration template), and providing a notice to follower end user devices to enable reconfiguration according to the configuration change.

In one or more embodiments, the leader end user device 110 can use computing and communication technology to perform function 864, which can include among other things, initiating a template creation process for generating the configuration template, enabling identification of a configuration of the leader end user device that includes device data (e.g., device settings, wallpaper, ringtones, content, and so forth) and applications of the leader end user device, presenting configuration limitation options for removing a subset of the device data and the applications of the second end user device from the configuration template, and receiving user input indicating a selection of the configuration limitation options to generate a limited configuration template. Function 864 can include providing access to the limited configuration template (e.g., via a website) which enables one or more follower end user devices (e.g., media processors 806, media devices 808 and/or mobile devices 816) to be configured according to the limited configuration template, adjusting the configuration of the leader end user device 110, and transmitting configuration change information (e.g. to the server 830 and/or to the follower end user devices) responsive to the adjusting of the configuration.

The media processors 806, media devices 808 and wireless communication devices 816 can be provisioned with software function 866 to utilize the services of server 830. Function 866 can include configuration and/or reconfiguration of the particular end user device according to all or a portion of the configuration template that is generated by and accessible through server 830. Function 866 can include performing conflict resolution when more than one configuration template is being utilized or more than one leader end user device 110 is being followed. As an example, function 866 can apply user preferences, such as received from user input or determined from an analysis of monitored user behavior, to decide which of two different ringtones (from two different configuration templates) is to be provisioned to the device. In another example, first and second leader end user devices 110 can be configured with a first internet browser. The second leader end user device 110 may experience a configuration change triggering a notification indicating that a second internet browser is now configured at the second leader end user device. Continuing with this example, function 866 operating at the follower end user device (e.g., mobile smart phone 816) can determine from monitored user behavior (e.g., indicative of a user's preference to software associated with the first internet browser) that the follower end user device will continue to utilize the first internet browser. In one or more embodiments, the function 866 can include prompting the user of the follower end user device to select among conflicting device data and/or applications. Various other conflict resolution techniques can be employed, including providing recommendations between conflicting device data and/or applications according to device capabilities, available resources, costs, and so forth.

In one embodiment, the system 800 can include one or more servers 880 (only one of which is shown) that enables downloading of device data (e.g., wallpaper, ringtones, content, and so forth) and/or applications according to a configuration template. The downloading can be responsive to a selection of a configuration template by a follower end user device, such as from among a group of configuration templates published by a website via web portal 902. The downloading can also be responsive to a reconfiguration notice received by a follower end user device which indicates that a leader end user device has performed a configuration change at the leader end user device.

In one embodiment, an incentive can be provided to a leader end user device (or its user) responsive to a follower end user device being configured according to a configuration template generated by the leader end user device. For example, a threshold number of followers (that utilize the configuration template generated by the leader end user device) can be established and the incentive can be provided once the leader has satisfied the threshold. In one embodiment, the transmitting of a notification indicating a configuration change at the leader end user device enables the follower end user device to be reconfigured via purchasing of the content through a link that accesses the server 880. The server 880 can be operated by the service provider managing server 830 or can be operated by a third party entity that is independent of the service provider.

Multiple forms of media services can be offered to media devices over landline technologies such as those described above. Additionally, media services can be offered to media devices by way of a wireless access base station 817 operating according to common wireless access protocols such as GSM, CDMA, TDMA, UMTS, WiMAX, SDR, LTE, and so on. Other present and next generation wide area wireless access network technologies can be used in one or more embodiments of the subject disclosure. In one or more embodiments, system 800 can include an IP Multimedia Subsystem (IMS) network architecture to facilitate the combined services of circuit-switched and packet-switched systems.

Figure 9:
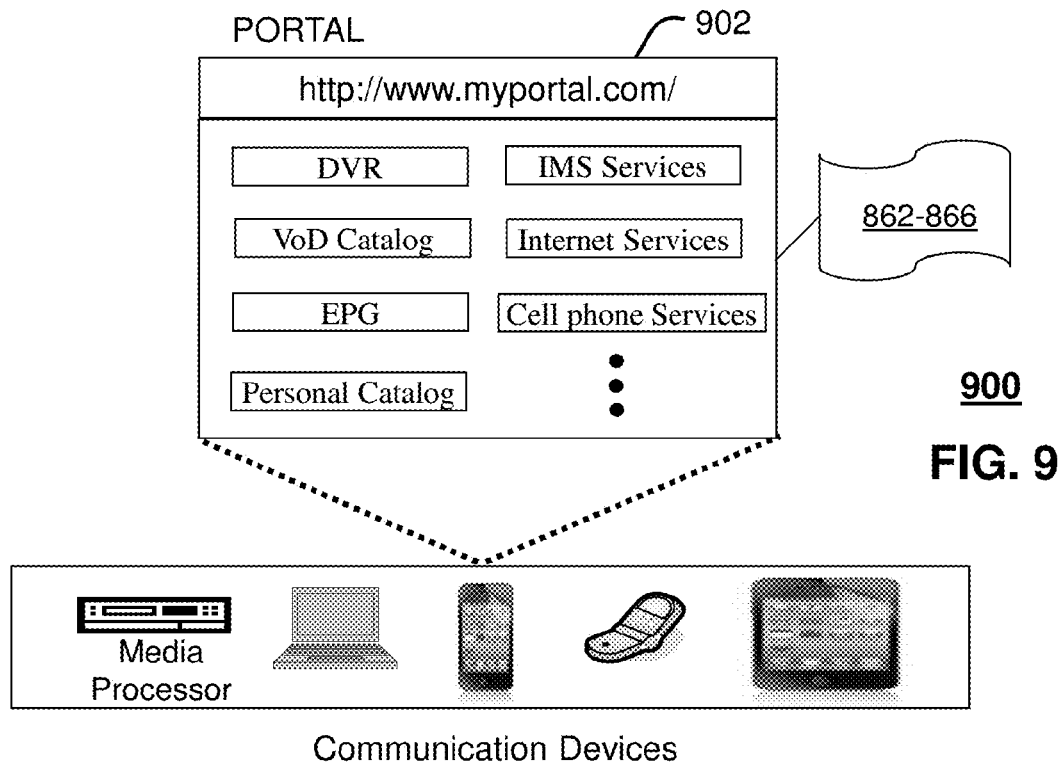
FIG. 9 depicts an illustrative embodiment of a web portal for interacting with the systems of FIGS. 1 and 8 for management of device configurations utilizing configuration templates.

FIG. 9 depicts an illustrative embodiment of a web portal 902 which can be hosted by server applications operating from the computing devices 830 of the communication system 800 illustrated in FIG. 8. The system 900 can be communicatively coupled to systems 100, 800 of FIGS. 1 and 8. The web portal 902 can be used for managing device configuration services including generation of a configuration template and selection of an already-generated configuration template. A web page of the web portal 902 can be accessed by a Uniform Resource Locator (URL) with an Internet browser using an Internet-capable communication device such as those described in systems 100 and 800. The web portal 902 can be configured, for example, to access a leader end user device 110 for detecting a configuration of the device, including determining device data (e.g., device settings, stored content, contact information, wallpaper, ringtones, and so forth) and applications resident on the device. In this example, the detected configuration or a portion thereof can then be utilized to generate a configuration template which may be published or otherwise made accessible (publicly or privately) so that one or more follower end user devices can access and use the configuration template for device configuration. The web portal 902 can also be used for provisioning IMS services described earlier, provisioning Internet services, provisioning cellular phone services, and so on.

The web portal 902 can further be utilized to manage and provision software applications 862-866 to adapt these applications as may be desired by subscribers and/or service providers of systems 100 and 800. For instance, web portal 902 can be utilized for provisioning a configuration application to an end user device. The configuration application can then be utilized, at any time, to access available configuration templates for configuring or reconfiguring the particular end user device.

Figure 10:
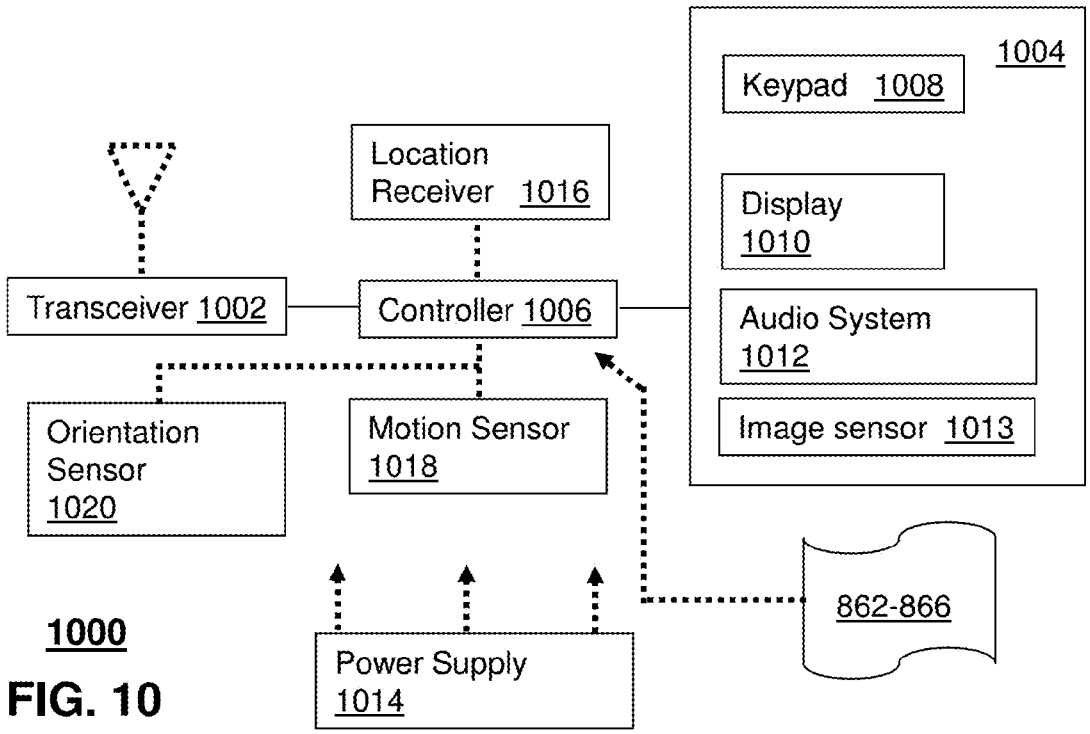
FIG. 10 depicts an illustrative embodiment of a communication device that can be used in managing device configurations utilizing configuration templates.

FIG. 10 depicts an illustrative embodiment of a communication device 1000. Communication device 1000 can serve in whole or in part as an illustrative embodiment of the devices depicted in systems 100 and 800. As an example, the communication device 1000 can operate as a follower end user device by receiving user input indicating a selection of a configuration template for configuring the device, where the configuration template includes device data for the first end user device and includes applications to be provided to the first end user device. The selection of the configuration template can be from among a group of configuration templates, such as viewable at a website via web portal 902. The configuration template can be previously generated based on a determination that a leader end user device (e.g. device 110 of FIG. 1) is configured, in whole or in part, with the device data and the applications. The communication device 1000 can be configured according to the configuration template (or a portion thereof) to generate a first configuration of the device 1000. In this example, the generation of the first configuration can be subject to restrictions applied by a user of the communication device 1000, such as designating particular device data and/or applications from the configuration template that are not to be provisioned to the device 1000. The communication device 1000 can receive a notification of a configuration change at the leader end user device, such as from server 830 or directly from the leader end user device 110. In this example, the notification can be generated based on monitoring for changes to the device data and the applications at the leader end user device 110. The communication device 1000 can be reconfigured according to the configuration change (or a portion thereof) to generate a second configuration of the device 1000. In this example, the generation of the second configuration can be subject to restrictions applied by the user of the communication device 1000, such as designating particular device data and/or applications from the configuration change that are not to be provisioned to the device 1000.

In another embodiment, the communication device 1000 can operate as a leader end user device by initiating a template creation process for generating a configuration template and by enabling identification of a configuration of the device that includes device data and applications resident to the device. The communication device 1000 can present configuration limitation options for removing a subset of the device data and the applications of the device from the configuration template and can receive user input indicating a selection of the configuration limitation options to generate a limited configuration template associated with the device. The communication device 1000 can provide the limited configuration template to a system (e.g., server 130 or server 830) for enabling a follower end user device(s) to access the limited configuration template and for enabling the follower end user device(s) to be configured according to the limited configuration template. The communication device 1000 can be adjusted as to its configuration and can transmit configuration change information indicative of the particular change (such as addition or deletion of device data and/or applications) in order to enable the follower end user device to be reconfigured according to the adjusting of the configuration of the device 1000.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices 110, 120, 130 of FIG. 1, the media processors 806, the media devices 808, and/or the portable communication devices 816 of FIG. 8. It will be appreciated that the communication device 1000 can also represent other devices that can operate in systems 100 and 800 such as an interactive television, a gaming console, a media player, and so forth. The controller 1006 can be adapted in various embodiments to perform the functions 862-866, respectively.

Upon reviewing the aforementioned embodiments, it would be evident to an artisan with ordinary skill in the art that said embodiments can be modified, reduced, or enhanced without departing from the scope of the claims described below. For example, the same leader end user device 110 can generate multiple configuration templates. The multiple configuration templates can, in whole or in part, have different device data and/or applications based on various factors, such as a first configuration template that is only accessible to end user devices of family members and friends which contains personal contact information, a second configuration template that is only accessible to end user devices of business associated which includes business contact information without personal contact information, and a third configuration template that is accessible to all end user devices which does not include any personal and business contact information.

In one or more embodiments, the group of selectable configuration templates can be categorized based on subject matter. For instance, configuration templates corresponding to leader end user devices of athletes can be grouped together while configuration templates corresponding to leader end user devices of actors can be placed in another group. The identity of the user may or may not be made available for the group of selectable configuration templates, such as based on the preference of the particular user of the leader end user device that generated the configuration template. In other embodiments, the group of selectable configuration templates can be categorized according to detected trends or preferences such as grouping configuration templates generated from leader end user devices that are involved in gaming while configuration templates generated from leader end user devices that are involved in business are placed in another group.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
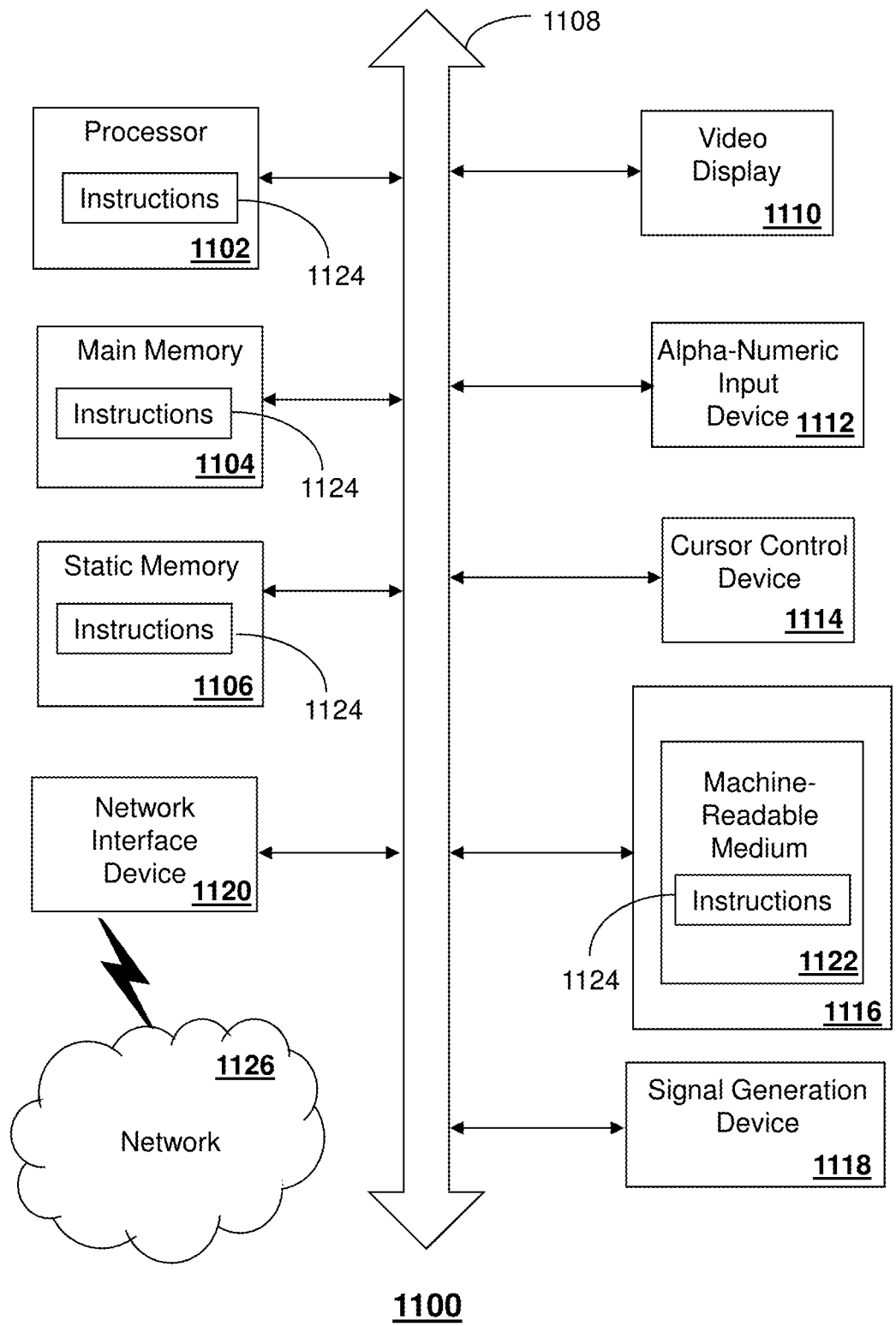
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as leader end user device 110, the follower end user device 120, the server 130, the server 830, and other devices of FIGS. 1 and 8 in order to enable generation of configuration templates from all or a portion of the configurations of leader end user devices, accessing and selecting the configuration templates by follower end user devices to enable those devices to be configured or reconfigured in whole or in part, monitoring for configuration changes with respect to leader end user devices, and notification of those configuration changes to enable follower end user devices to be reconfigured. In some embodiments, the machine may be connected (e.g., using a network 1126) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a first end user device, user input indicating a selection of configuration limitation options to generate a limited configuration template associated with the first end user device, wherein the configuration limitation options cause a removal of a subset of device data and applications of the first end user device from a configuration template associated with the first end user device;
   providing, by the first end user device, the limited configuration template to a system including a processor for enabling a second end user device to access the limited configuration template and for enabling the second end user device to be configured according to the limited configuration template;
   adjusting, by the first end user device, a configuration of the first end user device; and
   transmitting, by the first end user device, configuration change information responsive to the adjusting of the configuration, wherein the transmitting of the configuration change information enables the second end user device to be reconfigured according to the adjusting of the configuration of the first end user device.

2. The method of claim 1, further comprising initiating, by the first end user device, a template creation process for generating the configuration template associated with the first end user device.

3. The method of claim 1, further comprising presenting, by the first end user device, the configuration limitation options for causing the removal of the subset of the device data and the applications of the first end user device from the configuration template.

4. The method of claim 1, wherein the removal of the subset of the device data and the applications of the first end user device from the configuration template comprises removing a subset of contact information stored at the first end user device.

5. The method of claim 1, wherein the providing of the limited configuration template to the system enables a group of end user devices to access the limited configuration template and enables the group of end user devices to be configured according to the limited configuration template, and wherein the transmitting of the configuration change information enables the group of end user devices to be reconfigured according to the adjusting of the configuration of the first end user device.

6. The method of claim 1, further comprising:
   presenting, by the first end user device, access limitation options to limit access to the limited configuration template; and
   receiving, by the first end user device, other user input indicating another selection of the access limitation options;
   wherein the transmitting of the configuration change information that enables the second end user device to be reconfigured according to the adjusting of the configuration of the first end user device further enables the second end user device to access the limited configuration template according to the other selection of the access limitation options.

7. The method of claim 1, further comprising:
   receiving, by the first end user device from the system, an incentive responsive to the second end user device being configured according to the limited configuration template.

8. The method of claim 1, further comprising:
   accessing, by the first end user device, content, wherein the adjusting of the configuration of the first end user device utilizes the content, wherein the transmitting of the configuration change information enables the second end user device to be reconfigured via purchasing of the content through a link provided to the second end user device by the system.

9. The method of claim 1, wherein:
   the device data includes device settings;
   the transmitting of the configuration change information causes a short message service notice to be provided to the second end user device; and
   the short message service notice includes a single link for reconfiguration of the second end user device according to the adjusting of the configuration of the first end user device.

10. A device comprising:
    a processing system including a processor; and
    a memory that stores executable instructions that, when executed by the processing system, facilitate performance of operations, the operations comprising:
      generating a limited configuration template associated with a first end user device, wherein the generating is responsive to a selection of configuration limitation options, and wherein the limited configuration template does not include a subset of device data and applications of the first end user device that are identified by the configuration limitation options that are selected;
      providing a second end user device with access to the limited configuration template for enabling the second end user device to be configured according to the limited configuration template;
      detecting an adjustment to a configuration of the first end user device; and
      transmitting, to the second end user device, a notification of a configuration change at the first end user device responsive to the detecting of the adjustment, wherein the transmitting of the notification enables the second end user device to be reconfigured according to the adjustment to the configuration of the first end user device.

11. The device of claim 10, wherein the operations further comprise receiving a request for creating the limited configuration template associated with the first end user device.

12. The device of claim 10, wherein the operations further comprise providing the configuration limitation options in order to remove the subset of the device data and the applications of the first end user device.

13. The device of claim 10, wherein:
the adjustment to the configuration of the first end user device is based on content accessed by the first end user device; and
the transmitting of the notification further enables the second end user device to be reconfigured via purchasing of the content through a link provided to the second end user device by the processing system.

14. A non-transitory machine-readable storage medium comprising executable instructions that, when executed by a system including a processor, facilitate performance of operations, the operations comprising:
responsive to a selection at a first end user device of configuration limitation options, generating a limited configuration template associated with the first end user device, wherein the configuration limitation options cause a removal of a subset of device data and applications of the first end user device from a configuration template associated with the first end user device;
providing access to the limited configuration template to enable a second end user device to be configured according to the limited configuration template;
detecting an adjustment, at the first end user device, to a configuration of the first end user device; and
responsive to the detecting of the adjustment, transmitting, to the second end user device, a notification of a configuration change at the first end user device, wherein the transmitting of the notification enables the second end user device to be reconfigured according to the adjustment to the configuration of the first end user device.

15. The non-transitory machine-readable storage medium of claim 14, wherein the operations further comprise receiving a request to create the limited configuration template associated with the first end user device.

16. The non-transitory machine-readable storage medium of claim 14, wherein the operations further comprise providing, to the first end user device, the configuration limitation options.

17. The non-transitory machine-readable storage medium of claim 14, wherein the removal of the subset of the device data and the applications of the first end user device from the configuration template comprises removing a subset of contact information stored at the first end user device.

18. The non-transitory machine-readable storage medium of claim 14, wherein the adjustment to the configuration of the first end user device is based on content accessed by the first end user device.

19. The non-transitory machine-readable storage medium of claim 18, wherein the transmitting of the notification further enables the second end user device to be reconfigured via a purchase of the content through a link provided to the second end user device.

20. The non-transitory machine-readable storage medium of claim 14, wherein:
the notification comprises a short message service notice to the second end user device; and
the short message service notice includes a single link for reconfiguration of the second end user device according to the adjustment of the configuration of the first end user device.

* * * * *